UNITED STATES PATENT OFFICE.

WILLIAM J. HADDOCK, OF IOWA CITY, IOWA.

PROCESS OF FORMING CEMENT WALKS.

SPECIFICATION forming part of Letters Patent No. 525,146, dated August 28, 1894.

Application filed May 10, 1893. Serial No. 473,708. (No specimens.)

*To all whom it may concern:*

Be it known that I, WILLIAM J. HADDOCK, a citizen of the United States, residing at Iowa City, in the county of Johnson and State of Iowa, have invented a certain new and useful Process of Forming Cement Walks, Ways, Blocks, &c.; and I do hereby declare the following to be a full, clear, and exact description of the invention, such as will enable others skilled in the art to which it appertains to make and use the same.

This invention relates to a new and useful process of constructing cement walks, ways, and floors and blocks for similar purposes, &c., and it consists in the several steps hereinafter definitely pointed out in this specification and in the claim.

Heretofore in the construction of cement walks, &c., it has been found quite impossible to form a complete union between natural hydraulic cements and artificial or Portland cements and at the same time secure the required compactness, rigidity and durability. All efforts in this regard reduced the said material to a plastic mass and hence failed to get good results. It is further a well known fact that in the scientific handling of said cements and making them up for use in any of the economic arts, that more water than is sufficient to moisten each grain of the cement or making the cement into a plastic mass greatly weakens and deteriorates the mixture or finished article.

Heretofore in the manufacture of cement walks, the surface stratum or coating of cement and sand was always put on in the form of a plastic mortar and finished in that state and left to dry. This process leaves the top of the walk weak and porous where the greatest strength is required.

The aim and purpose of this invention are to overcome all such defects incident to the uniting of natural and artificial cement and by so treating and mixing the material that a solid, compact and durable article will be produced and by so scientifically manufacturing the walk, &c., that the surface stratum will be the densest and strongest portion of the structure.

A cement walk, way, &c., or cement structure for similar purposes I will define as consisting of two parts but thoroughly united. These parts may be described as the base and top.

This invention consists in first forming a base by taking a good natural hydraulic cement and mixing the same with sand or sand and gravel and water and the mass made just wet enough to moisten each grain of cement and sand so that the mixed mass will compact easily and thoroughly and when so compacted show no water on the top of the dense compressed bed of material.

The proportion of sand or sand and gravel and cement will vary with the character and quality of the natural hydraulic cement used and the strength of the walk, &c., which may be desired but ordinarily two volumes of good coarse sand to one volume of said cement will make a good base, or the base might consist of three volumes of clean sifted gravel or equivalent material and two volumes of sand to one and one half volumes of said cement, more or less as required. The aforesaid material is thoroughly mixed and moistened as stated and then placed on a suitable bed or where the walk, way, &c., is desired, and well compacted and compressed by tamping or other mechanical means until the mass has become solid and firmly united and presents an even surface. On the base thus formed a slight coating of water is applied to its surface and on this water is sifted or spread a quite light thin layer of cement (either natural or artificial cement) sufficient to absorb the water and leave the cement moist. The top referred to, or upper coating is then put on. This top or upper coating consists of artificial or Portland hydraulic cement mixed with sand in the proportion substantially of one volume of said cement to one volume of sand, more or less as the case requires considering the quality of the cement and purpose of the walk, blocks, &c. The mass is then moistened by incorporating a sufficient amount of water to simply moisten each particle of cement and sand. The mass thus formed is placed directly on the base and evenly spread before the thin coating of cement has become hard and is then firmly united with the base and compressed by tamping or other mechanical means to an even level surface. The finished article is now ready for use and has the appearance of cut stone. So little water must be used that it will not show on the surface after the top is thoroughly compressed in the manner aforesaid.

The proportion of sand and cement for either the base or top will be varied with the character and quality of the cements used and the strength required in the finished work. The thickness of the base and as well the thickness of the top will also depend on the strength required in the walk or way, &c., when properly finished. If the surface of the base is just damp enough, and the material of the top is the same, no water need be put on the surface of the base, and no cement sifted on it to form a perfect union. Thorough tamping with the material in good order will cement the base and top perfectly. I have also found that if the material is all in good order and the top of the base is only dry from exposure to the weather that a wetting of the surface of the base with water alone (and without a cement coating) before the top is put on, will form a perfect union if the top is tamped well at once.

Any mode of applying water or water and cement or water, cement and sand to the surface of the base before the top is put on will make a union if the top is mixed as stated and thoroughly compacted by any mechanical means or sufficiently tamped to an even smooth surface.

It is evident that slight variations in the method and mode described can be made without in the least departing from the nature and principles of my invention.

Having thus described my invention, what I claim as new, and wish to secure by Letters Patent, is—

The method of forming walks, ways, blocks, &c., consisting of forming a base of natural hydraulic cement and sand, compressing the same, coating the surface thereof with water, adding a layer of cement to the water, applying a top of artificial cement and sand and compressing the same, substantially as described.

In testimony whereof I affix my signature in presence of two witnesses.

WILLIAM J. HADDOCK.

Witnesses:
E. A. BOERNER,
W. J. MCCHESNEY.